(No Model.) 2 Sheets—Sheet 2.

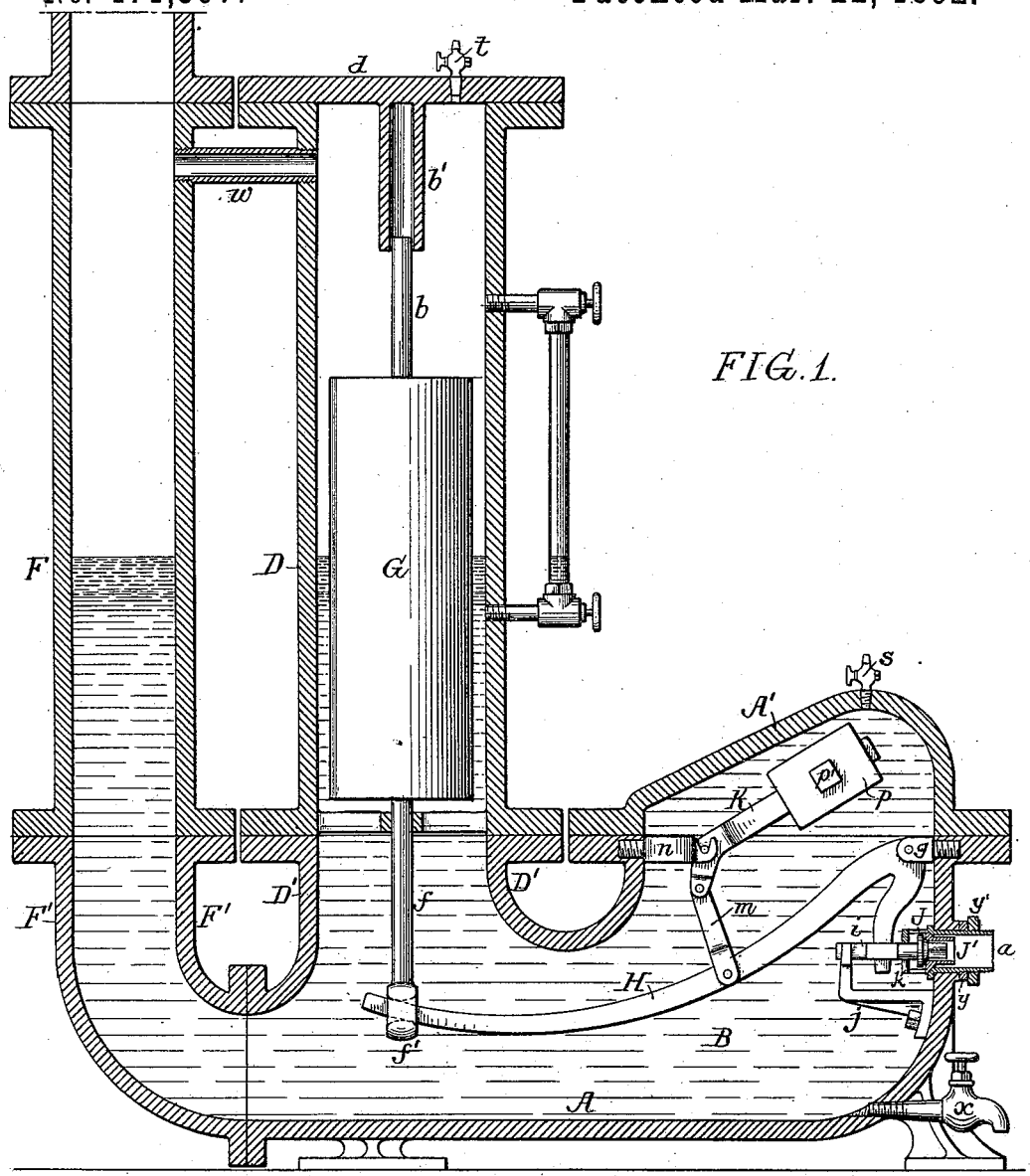
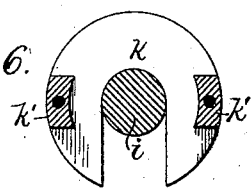
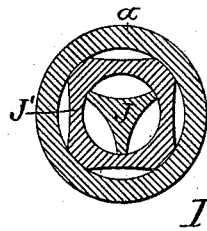

E. RENNER & J. HOFBAUER.
STEAM TRAP.

No. 471,397. Patented Mar. 22, 1892.

Witnesses:
Hamilton D. Turner
Alex. Barkoff

Inventors
Edmund Renner &
John Hofbauer
by their Attorneys
Howson v Howson

UNITED STATES PATENT OFFICE.

EDMUND RENNER AND JOHN HOFBAUER, OF PHILADELPHIA, PENNSYLVANIA.

STEAM-TRAP.

SPECIFICATION forming part of Letters Patent No. 471,397, dated March 22, 1892.

Application filed January 28, 1891. Serial No. 379,358. (No model.)

*To all whom it may concern:*

Be it known that we, EDMUND RENNER and JOHN HOFBAUER, citizens of the United States, and residents of Philadelphia, Pennsylvania, have invented certain Improvements in Steam-Traps, of which the following is a specification.

The object of our invention is to construct a steam-trap which is extremely sensitive in its action, is not liable to cause fluttering movements of the discharge-valve, is free from liability to be gorged by a rapid flowing of water into the same, and affords provision for the use of counterbalanced lever mechanism for operating the valve without detracting from the sensitiveness of the trap.

Figure 2:
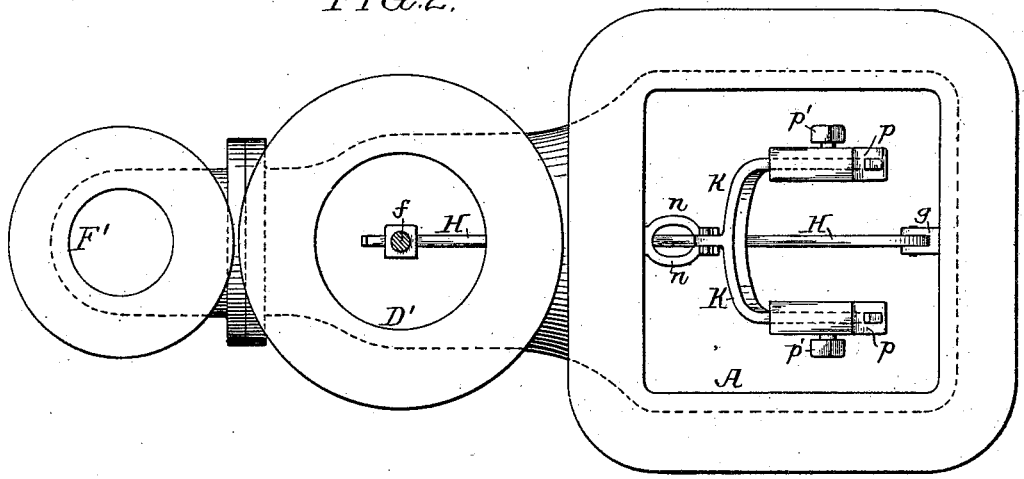
Figure 3:
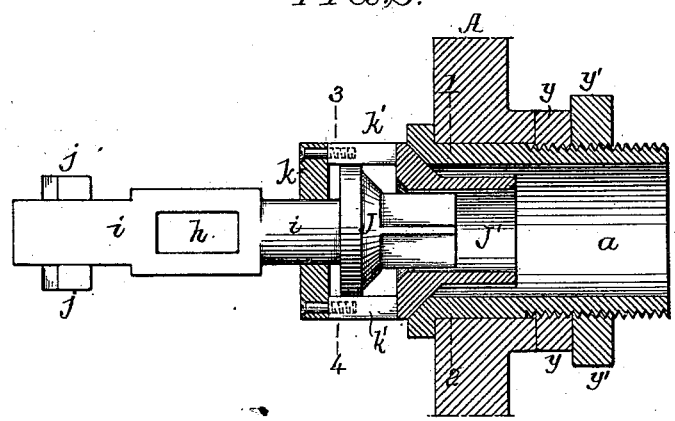
Figure 4:
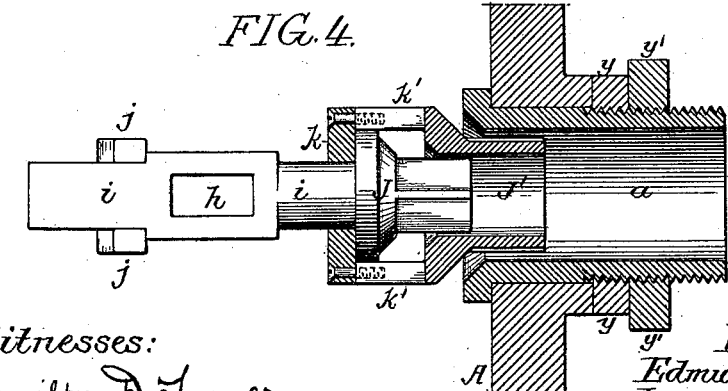

In the accompanying drawings, Figure 1 is a longitudinal section of a steam-trap constructed in accordance with our invention. Fig. 2 is a plan view of the base portion of the trap with the stand-pipes and cover-plate removed and the valve omitted. Figs. 3 and 4 are enlarged sectional views of the discharge-valve of the trap. Fig. 5 is a transverse section on the line 1 2, Fig. 3; and Fig. 6 is a transverse section on the line 3 4, Fig. 3.

A represents the casing of the lower or base portion of the trap, which contains a water-chamber B, and has at one end the discharge-nozzle $a$, to which is adapted the duplex valve, referred to hereinafter.

Rising from the base-section A of the trap are two stand-pipes D and F, each of which is very materially contracted in area as compared with the area of the chamber B, the pipe D being connected to a neck D' on the casing A and the pipe F being connected by an elbow F' to one end of said casing. Within the stand-pipe D is a float G, the upper stem $b$ of which is adapted to a tubular guide $b'$, depending from the cap or cover plate $d$, which closes the upper end of said stand-pipe, the lower stem $f$ of the float having a slotted head $f'$ for the reception of the long arm of a lever H, which is hung to a stud $g$, secured to the casing A, the short arm of said lever H passing through a slot $h$ in the stem $i$ of a valve J, which is seated in a supplementary tubular valve J', the latter being seated in the inner end of the discharge-nozzle $a$, as shown in Figs. 1 and 3. This supplementary or tubular valve J' has a cap $k$, which is secured to studs $k'$ on the rear face of the valve, and has a transverse slot for the entrance of the stem $i$, as shown in Fig. 6, so that the valve J has a limited play independently of the valve J'—that is to say, a movement between the face of said valve J' and the cap $k$—the inner end of the valve-stem $i$ being guided in a bracket $j$, secured to the casing A.

The lever H is connected by a link M to the short arm of a lever K, hinged to a forked stud $n$, secured to the casing A, the inner arm of said lever K being also forked and each limb of the arm being provided with an adjustable counterbalance-weight $p$, which can be secured in position by means of a set-screw $p'$, this lever and its weights serving to partially counterbalance the weight of the float G, so that the latter can be easily lifted when the water of condensation rises around the same to a certain height.

The cap A', which closes a portion of the top of the casing A, has in its highest portion a petcock $s$, and in the cover $d$, which closes the stand-pipe D, is a like petcock $t$.

In the operation of the trap the water accumulates in the chamber B and traps the steam in the upper portion of said chamber and in the stand-pipe D. The petcock $s$ is opened, so as to permit the escape of steam from the upper portion of the chamber B, so that said chamber becomes completely filled with water. If the petcock $t$ is allowed to remain closed and there is no communication between the stand-pipes D and F, the condensation of the steam in the stand-pipe D will cause a partial vacuum therein, which, while not preventing the operation of the trap, will serve to retard the flow of water from said stand-pipe D when the valve J is opened. Hence it is usual to open the petcock $t$, so as to provide a more or less restricted flow of steam or air through the same. The preferable plan, however, is to provide a perfect balance between the stand-pipes D and F by means of a connecting-pipe $w$ near the top of said pipes, so that the pressure in both pipes will be alike and the water will rise and fall freely in each pipe and will maintain the same level in both. As the water rises in the stand-pipes D and F the float also rises and the discharge-valve J is opened, so that the water of condensation is permitted to escape through the nozzle a until the level of water in the stand-pipes lowers sufficiently to permit such a descent of the float as will close the valve.

The large area of the water-chamber in the casing A permits of the use of the lever mechanism for operating the discharge-valve, while the greatly-contracted area of the stand-pipes F and D insures the sensitiveness of the trap, for a comparatively small amount of water entering the trap will cause such a rise of level in the stand-pipes as to raise the float and open the valve by a positive movement, the valve being closed by a like positive movement on the descent of the float, whereas a small amount of water entering a chamber of large area would only cause such a slight rise of level as to cause a fluttering of the discharge-valve.

Choking of the trap by the rapid flow of water into the same is prevented by the use of the double valve J J', for if after the float G has raised sufficiently to open the valve J the water still continues to enter the trap faster than it can be discharged through said valve J the float will rise still further and the valve J, acting on the cap k of the valve J', will open the latter, and thus materially increase the area of discharge, the aggregate area of discharge of the two valves being sufficient to free the trap under all circumstances of use. Hence the trap can never become gorged with water.

In order to permit of the drainage of the chamber B, the casing A has close to the bottom a drainage-valve x.

The discharge-nozzle a is held in place on the casing A by means of a clamp-nut y and a lock-nut y', as shown in Figs. 3 and 4, so that said nozzle can be readily detached, and on removing the cap A' the valves and valve mechanism are accessible and can be readily removed and replaced, so that ample facilities are provided for the ready repair of any part of the trap which is liable to become worn or broken in use.

Having thus described our invention, we claim and desire to secure by Letters Patent—

1. The combination, in a steam-trap, of the base-chamber and its casing having a discharge-nozzle, a valve adapted to said nozzle, two stand-pipes, both of contracted area in respect to the base-chamber and projecting above the same, a float contained in one of said stand-pipes, and a lever contained in the base-chamber and engaging with the stem of the valve and with the downwardly-projecting stem of the float, substantially as specified.

2. The combination of the base-chamber and its casing having a discharge-nozzle, the valve adapted to said nozzle, two contracted stand-pipes projecting upward from said chamber and having a communication near their upper ends, a float contained in one of said stand-pipes, and a lever contained in the base-chamber and engaging with the valve-stem and with the downwardly-projecting stem of the float, substantially as specified.

In testimony whereof we have signed our names to this specification in the presence of two subscribing witnesses.

EDMUND RENNER.
JOHN HOFBAUER.

Witnesses:
EUGENE ELTERICH,
HARRY SMITH.